United States Patent [19]

Klecker et al.

[11] 4,078,340
[45] Mar. 14, 1978

[54] LOW DENSITY ABRASIVE PAD HAVING DIFFERENT ABRASIVE SURFACES

[75] Inventors: Gary J. Klecker, River Falls, Wis.; Roger L. Abler, White Bear Lake, Minn.

[73] Assignee: Minnesota Mining and Manufacturing Company, St. Paul, Minn.

[21] Appl. No.: 422,918

[22] Filed: Dec. 7, 1973

[51] Int. Cl.$^2$ ............................................. B24D 11/02
[52] U.S. Cl. ...................................... 51/295; 51/296; 51/298 A
[58] Field of Search ................ 51/295, 296, 294, 297, 51/298; 15/114, 115, 116, 117, 118; 161/154

[56] References Cited

U.S. PATENT DOCUMENTS

| | | | |
|---|---|---|---|
| 81,986 | 9/1868 | Crane | 51/295 |
| 2,958,593 | 11/1960 | Hoover | 51/298.1 |
| 3,020,139 | 2/1962 | Camp et al. | 51/295 |
| 3,171,151 | 3/1965 | Sickle et al. | 161/154 |
| 3,175,331 | 3/1965 | Klein | 51/295 |
| 3,510,283 | 5/1970 | McGurran | 51/295 |
| 3,619,149 | 11/1969 | Kitazawa | 51/295 |

Primary Examiner—Donald J. Arnold
Attorney, Agent, or Firm—Cruzan Alexander; Donald M. Sell; Richard Francis

[57] ABSTRACT

An abrasive pad, especially useful in cleaning and scouring kitchen utensils, is comprised of a lofty fibrous nonwoven structure of mixed denier nylon or polyester crimped filaments bonded at contacting points with thermosetting resin containing finely divided soft abrasive and coated on one of its surfaces with thermosetting resin containing finely divided hard abrasive. The pad surface containing soft abrasive provides a mildly abrasive surface capable of cleaning, without harmfully scratching, non-stick plastic pan coatings (e.g., "Teflon" perfluoroethylene polymer), plastic dishes, etc. The pad surface containing the hard abrasive provides an aggressive abrasive surface capable of scouring stainless steel or aluminum pots and pans soiled with baked-on or burned cooking residues.

10 Claims, 1 Drawing Figure

U.S. Patent  March 14, 1978  4,078,340
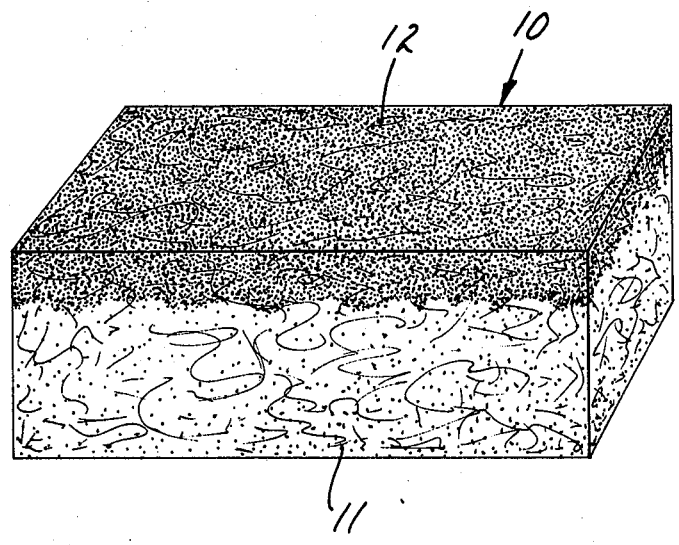

LOW DENSITY ABRASIVE PAD HAVING DIFFERENT ABRASIVE SURFACES

BACKGROUND OF THE INVENTION

The invention relates to low density abrasive pads.

The use of low density abrasive pads for scouring pots and pans is known. These pads are typically nonwoven lofty open mats formed from randomly disposed fibers which are bonded at points where they intersect and contact each other with a binder which contains abrasive. One very successful commercial embodiment of such a pad is that sold under the trade designation "Scotchbrite" by the 3M Company of Saint Paul, Minnesota.

Low density abrasive pads can be prepared by the method disclosed in Hoover et al U.S. Pat. No. 2,958,593. These pads are especially suited for pot and pan scouring because of their non-clogging and non-filling nature, when used in conjunction with soapy water. After use, they can be readily cleaned upon simple flushing with water, dried and left for substantial periods of time, and then re-used.

While these pads are extremely useful for cleaning pots and pans, they are typically too abrasive for cleaning non-stick plastic coatings on cookware and for cleaning plastic eating utensils. If they are made less abrasive, as they are for some purposes, they are not useful for scouring pots and pans. While attempts have been made to produce pads having one abrasive face and one polishing face (see, e.g., Sickle et al U.S. Pat. No. 3,171,151), such pads are required to be undesirably densified in their production and are thus not uniformly open and lofty.

SUMMARY OF THE INVENTION

The present invention provides a lofty non-woven, open abrasive pad which is sufficiently aggressively abrasive to scour pots and pans and yet has a mildly abrasive surface which will not scratch plastic surfaces. The pad of the invention has one aggressively abrasive surface and one mildly abrasive surface, providing the dual purpose functions described above. The pad is light weight, lofty, and extremely open throughout, providing the essential non-clogging and non-filling nature which permits it to be used in dishwater where it is common to find bits of food or other residues which could clog an abrasive article not having these features. The pad of the invention also has the ability to reveal which surface should be used merely by feel, this being an advantage because dishwater, being typically opaque, many times prevents the user from seeing the pad.

The pad of the invention is typically rectangular or circular in shape in a size conveniently held in the user's hand. The pad is comprised of a lofty fibrous nonwoven structure of mixed denier nylon or polyester crimped filaments bonded at contacting points with thermosetting resin containing finely divided soft abrasive and is coated on one of its surfaces with thermosetting resin containing finely divided hard abrasive.

The pad surface containing the soft abrasive provides a mildly abrasive surface capable of cleaning plastic (e.g., "Teflon") coated pan surfaces, plastic dishes, etc., without harmful scratching. The pad surface containing the hard abrasive provides an aggressive abrasive surface capable of scouring pots and pans that are soiled with baked-on or burned cooking residues.

The unique nature of the pad, as will hereinafter be explained, causes the mildly abrasive surface to feel soft and the aggressive abrasive surface to feel somewhat harder or coarse, permitting the user to select the desired surface by feel, even in opaque dishwater.

DRAWING

For convenience in visualizing the product of this invention attention is directed to the accompanying drawing in which the single FIGURE represents a view in perspective of a low density abrasive pad having different abrasive surfaces made in accordance with this invention.

In the drawing, the pad 10 is formed of randomly disposed and interlaced crimped mixed denier fibers bonded together at points where they cross and contact each other with a binder containing a relatively soft abrasive to form mildly abrasive portion 11. One surface of the pad is coated with additional binder containing a harder abrasive material to produce a more aggressively abrasive portion 12.

The pad is characterized by its extreme openness and low density, typically having a void volume within the range of from about 85% to 97%. Pad structures having void volumes less than about 85% are useful but not preferred.

The web component or structure used to prepare the pad is preferably made of nylon or polyester synthetic fibers which have been crimped and are of mixed denier. That is, the web contains both small and large diameter fibers to provide the open, low-density structural properties to the pad and relatively fine fibers to provide softness, some water-retaining ability and a greater surface for abrasive to be adhered. The large diameter fibers are on the order of 40 to 70 denier (about 60–100 microns in diameter) and at least about one inch (2.5 cm) long when fully extended. The smaller diameter fibers are of the same minimum length and in the range of about 10 to 20 denier (about 30–50 microns in diameter).

Crimping can be accomplished by well known "gear" or "stuffer box" crimping methods or by other known methods. The filaments should have from 4 to 8 crimps per centimeter to provide sufficient entanglement of fibers for a handleable web. Crimping will typically cause a 50% reduction in fiber length. For example, a crimped 4 cm fiber will have an extended length of 4 cm and an apparent unextended length of about 2 cm.

The weight ratio of the small diameter fibers to the large diameter fibers is relatively important to maintain the desired degree of openness, structure and a moderate degree of water retention. Preferably, the weight ratio of large diameter fibers to small diameter fibers is in the range of about 1:3 to about 3:1; most preferably this ratio is about 1:1.

In forming the web component of the pad, it is preferred to use a "Rando-Webber" and "Rando-Feeder" machine (sold by the Curlator Corporation, Rochester, New York) and described in U.S. Pat. Nos. 2,744,294, 2,700,188, 2,451,915 and 2,703,441. The web component is prepared having a thickness on the order of at least two times the desired resultant thickness and a width limited by the web producing equipment. Typically, the web component will weigh on the order of 400 grams per square meter.

The abrasive materials for the pad of the invention are of two types, as previously explained. The soft abrasive has a Mohs hardness in the range of about 3 to 7 and includes such material as garnet, flint, silica, pumice, and calcium carbonate. The particle size of the soft abrasive should be on the order of about 180 grade (average diameter about 90–100 microns) or finer to provide the desired mildly abrasive surface to the pad. The abrasives having these properties will, when incorporated into the pad, provide a mildly abrasive surface which does not damage plastic surfaces such as "Teflon" plastic coatings and plastic dinnerware.

The more aggressive abrasive has a Mohs hardness value greater than 8 and a particle size on the order of 280 grade (average diameter about 40–50 microns) or finer. Abrasive materials having Mohs hardness values greater than 8 include silicon carbide, aluminum oxide, topaz and diamond. It is of course understood that diamond would not be economically practical to use unless a cheap source thereof is discovered.

The thermosetting binder utilized to adhere the abrasive particles within the pad and the filaments together is, when cured or hardened, resistant to soapy water and sufficiently strong to retain the abrasive during repeated use. The term "thermosetting" has its conventional meaning; i.e., this binder has an initial liquid (or soluble) stage which permits it to be mixed with the abrasives described above and permits the mixture applied to the web component and upon heating is converted to an insoluble infusible solid. Binders which have been found to be particularly suitable for use in the invention include phenol-aldehyde resins, butylated urea aldehyde resins, epoxide resins, polyurethane resins, polyester resins such as the condensation product of maleic and phthalic anhydrides and propylene glycol. Phenol-aldehyde resins are most preferred for use with nylon filaments. Polyurethane resins and phenol-aldehyde resins are most preferred for polyester filaments, the polyurethane usually comprising the soft abrasive binder with phenol-aldehyde resin usually comprising the binder for the hard abrasive, as will be explained.

The amount of binder employed is adjusted toward the minimum consistent with bonding the filaments together at their points of contact and with the firm bonding of the abrasive grains. Too much binder obscures the abrasive, while too little binder forms a weak punky adhesive. It should be noted that finer grade abrasives which have greater surface area tend to affect the binders more readily than coarser grade abrasives. Binders and any solvent therefor should also be selected with the particular fiber to be used so that embrittling penetration thereof does not occur.

It should be noted that the web component, which contains mixed denier filaments or fibers, can be prepared from fibers of different compositions, for example, from both nylon and polyester. It is preferred however to prepare the web entirely formed from fibers of the same composition. Additionally, while it is preferred to use the same binder to apply both the soft abrasive and the hard abrasive, different binders may be used for each.

In a typical preparation, the web is roll coated with a dispersion comprised of the soft abrasive and binder to completely coat its entire bulk, bonding the fibers together. Thereafter, this coating may be first dried or the final coating of binder and hard abrasive may be applied immediately and both coatings cured simultaneously. The final coating containing the hard abrasive and binder is sprayed on one major surface of the coated web to provide penetration on the order of 1 to 7 mm of the thickness of the web (about 3–4 mm being preferred). The spray coating, upon being cured at a suitable temperature, is characterized by the formation of small globules of abrasive and binder which accumulate at contact points of the filaments on the surface which had been sprayed. The gross effect of this coating is a coarse, harsh feeling surface which is unlike the roll coated portion of the mat which is soft to the feel.

The abrasive pad should be at least 1.3 cm thick to maintain the required difference in surface abrasivenesses. At less than 1.3 cm, some effect of the hard abrasive surface may be seen when using the soft abrasive surface. The size of the pad is convenient to fit in the user's hand. For example, circular discs should not be larger than 15 cm in diameter nor should rectangular shapes be larger than 15 cm in length or width. A convenient size for the rectangular pad is 75 mm by 100 mm.

It is within the scope of the invention to include other ingredients in the abrasive pad such as pigment, fillers, and other additives. It may be desired, for example, to color the aggressively abrasive surface coating a color which contrasts with that of the remaining mildly abrasive portion of the pad. It is also possible to impregnate the pad with a soap composition such as that disclosed in U.S. patent application Ser. No. 315,118 filed Dec. 14, 1972 now U.S. Pat. No. 3,788,999.

Having described the novel abrasive pad of the invention generally, the same will now be further illustrated with the aid of the following non-limiting specific example, wherein parts are by weight unless otherwise specified.

EXAMPLE

A lofty non-woven web approximately 7.6 cm thick and weighing approximately 400 grams per square meter, was formed on a "Rando-Webber" machine from 50% 15 denier (43 micron diameter) and 50% 58 denier (85 micron diameter) 3.8 cm (extended length) crimped oriented nylon fibers.

An abrasive/binder slurry was prepared by blending the following components:

| Ingredients | Parts |
|---|---|
| isopropyl alcohol | 12:00 |
| ethyleneglycol monethyl ether ("Cellosolve") | 2:10 |
| A-stage base catalyzed phenol-formaldehyde resin (70% solids) | 28.72 |
| antifoam emulsion (Dow Corning) | .022 |
| ground silica, grade 360 and finer | 12.20 |
| phthalocyanine green pigment | 0.27 |
| titanium dioxide pigment | 0.91 |

The lofty nonwoven web described above was then coated by passing it between a pair of 20 cm diameter knurled 40 durometer rubber rolls set with zero clearance, the lower roll rotating in a pan of the liquid slurry just described, the upper roll also receiving slurry from a metering roll set at 0.3 mm clearance therefrom, producing a dried add-on weight of approximately 495 grams per square meter.

The coated web was then spray coated with a second abrasive/binder slurry consisting of the following ingredients:

| Ingredients | Parts |
|---|---|
| isopropyl alcohol | 1.00 |
| ethyleneglycol monethyl ether ("Cellosolve") | 3.18 |

-continued

| Ingredients | Parts |
| --- | --- |
| A-stage base catalyzed phenol-formaldehyde resin (70% solids) | 22.80 |
| aluminum oxide mineral 280 grade and finer | 37.30 |
| phthalocyanine green pigment | 0.43 |
| carbon black pigment, furnace type | 0.03 |
| titanium dioxide pigment | 0.95 |

The coatings were simultaneously cured by passing the coated web through a forced air oven heated at 140°–155° C with a residence time of 10 minutes to produce the abrasive product in bulk at a thickness of 23 mm and void volume of about 95%. The second coating penetrated about 4 mm into the pad and produced an add-on weight of 260 grams per square meter. The coated web was then cut into approximately 75 mm by 100 mm rectangular shapes for use.

When the mildly abrasive surface of the pad was used to wash a soiled "Teflon" plastic coated pan, no scratching of the surface of the plastic coating was noted yet the pad easily cleaned this surface with mild rubbing in soapy water. The more aggressively abrasive surface of the pad easily scoured soiled stainless steel cookware with more aggressive rubbing in soapy water.

A 10 cm diameter pad of the abrasive product was cut and tested for abrasiveness on each of its surfaces with a modified Schiefer abrasive test by first drying eight 10 cm diameter circular clear polymethyl methacrylate polymer discs at 65° C for 15 minutes, cooling the discs to room temperature (about 20° C) and weighing them to the nearest milligram.

In accordance with this test, each disc was adhered to a rigid rotary support of a Schiefer abrasion testing machine. An abrasive pad was then rotated at 250 r.p.m. for 1000 revolutions under an applied force of 2¼ kg. The disc was then washed, dried and weighed and the weight loss recorded. This procedure was repeated with both the aggressively abrasive and the mildly abrasive surfaces to give the weight lost in grams for each 1000 revolution cycle. Results are noted below:

| cycle | mildly abrasive surface | aggressively abrasive surface |
| --- | --- | --- |
| 1000 | 0.0836 | 0.5830 |
| 2000 | 0.0371 | 0.4882 |
| 3000 | 0.0296 | 0.4497 |
| 4000 | 0.0256 | 0.4154 |
| 5000 | 0.0214 | 0.4057 |
| 6000 | 0.0204 | 0.3814 |
| 7000 | 0.0168 | 0.3734 |
| 8000 | 0.0156 | 0.3573 |

The foregoing data reveals the relative abrasiveness of each abrasive surface of the pad of the invention.

What is claimed is:

1. A low density abrasive pad having a mildly abrasive surface and a more aggressively abrasive surface, thus being especially suited for cleaning and scouring kitchen utensils, said mildly abrasive surface being capable of cleaning but not harmfully scratching nonstick plastic pan coatings and other plastic surfaces, said more aggressively abrasive surface being capable of scouring soiled pots and pans, said pad having a void volume of about 85% to 97% and consisting essentially of in combination:

a lofty, nonwoven mat, having a thickness of at least about 1.3 cm when incorporated in said pad and extremely high void volume, consisting essentially of crimped mixed denier nylon, polyester, or mixtures of both nylon and polyester filaments at least 2.5 cm in length when fully extended, said mixed denier filaments consisting essentially of small diameter filaments on the order of 10 to 20 denier and larger diameter filaments on the order of 40 to 70 denier wherein the weight ratio of large diameter filaments to small diameter filaments is in the range of 1:3 to about 3:1, said fibers being bonded together at points where they cross and contact each other with a soapy-water-resistant tough thermoset first resin binder which contains a finely divided soft abrasive material having a Mohs hardness on the order of 3 to 7 and a particle size on the order of 180 grade or finer, and coated over one entire major surface of said pad and penetrating into said pad to a depth on the order of 1–7 mm a soapy-water-resistant tough second resin binder which contains finely divided hard abrasive material having a Mohs hardness in excess of 8 and a particle size on the order of 280 grade or finer.

2. The pad of claim 1 wherein the hard abrasive binder composition penetrates on the order of 3 to 4 mm into said pad.

3. The pad of claim 1 wherein said weight ratio is about 1:1.

4. The pad of claim 1 wherein said soft abrasive is selected from the group consisting of garnet, flint, silica, pumice and calcium carbonate.

5. The pad of claim 1 wherein said hard abrasive is selected from the group consisting of silicon carbide, aluminum oxide, topaz and diamond.

6. The pad of claim 1 wherein said binders are both phenol-aldehyde binders and said filaments are nylon filaments.

7. The pad of claim 1 wherein said first binder is polyurethane, said second binder is a phenol-aldehyde binder and said filaments are polyester filaments.

8. A method of making an abrasive pad having a mildly abrasive surface and a more aggressively abrasive surface comprising:

roll coating a lofty, nonwoven mat at least about 1.3 cm thick when incorporated into said pad and of mixed denier filaments with a first slurry of thermosetting binder resin and soft abrasive material having a Mohs hardness on the order of 3 to 7, spray coating entirely one major surface of the pad with a second slurry of a thermosetting binder resin and hard abrasive having a Mohs hardness greater than about 8, said spray coating penetrating into said pad to a depth on the order of 1 to 7 mm, and heating said binder resins at a temperature and for a time sufficient to form infusible insoluble cured products thereof.

9. The method of claim 8 comprising the additional step of cutting said pads into rectangular or circular shapes.

10. The method of claim 9 wherein said heating to cure said binder resins occurs after each coating step.

* * * * *